United States Patent [19]

Talalay

[11] Patent Number: 4,504,336

[45] Date of Patent: Mar. 12, 1985

[54] TAB APPLYING METHOD AND APPARATUS

[76] Inventor: Anselm Talalay, 2867 Ludlow Rd., Cleveland, Ohio 44120

[21] Appl. No.: 565,711

[22] Filed: Dec. 27, 1983

[51] Int. Cl.³ ................................................ B32B 1/00

[52] U.S. Cl. ...................................... 156/64; 156/216; 156/363; 156/364; 156/443; 156/475; 156/492; 156/521

[58] Field of Search ................................ 156/362-364, 156/517, 518, 521, 443, 64, 492, 475, 478-480, 212, 216

[56] References Cited

U.S. PATENT DOCUMENTS 2,203,977 6/1940 Bennett ................................ 156/364
3,681,160 8/1972 Richie et al. ..................... 156/521 X
3,904,466 9/1975 Jones ............................... 156/364 X
4,183,779 1/1980 Barber ............................. 156/364 X

*Primary Examiner*—David Simmons
*Attorney, Agent, or Firm*—Richard G. Stephens

[57] ABSTRACT

Method and apparatus for affixing index tabs to book pages include accurately embossing indicia along a continuous first strip of plastic-coated paper, adhering cardboard reinforcing strips to the first strip and slitting and scoring the resulting assembly to provide tab strip stock. The tab strip stock is severed into successive tabs and carried by vacuum-operated clamping means to an adhesive-activating station and then a tab application station. Successive pages of a book are fed past the tab application location; those to be provided with tabs are stopped at various positions relative to the tab application locations and the clamping means folds tabs around the edges of selected pages.

36 Claims, 16 Drawing Figures

TAB APPLYING METHOD AND APPARATUS

This invention relates to method and apparatus for manufacturing books having index tabs affixed to the edges of selected pages. A variety of types of books carry index tabs affixed to the outside edges of selected pages, ordinarily at different vertical locations on different pages. An address book may have tabs bearing the notations "A" through "Z" affixed to respective pages for example, with one or several pages which carry no tabs spaced between pairs of pages which do carry tabs. An appointment book, as another example, may have tabs labelled "JAN" through "DEC" affixed to twelve pages which begin respective monthly sections of the book, with numerous untabbed intervening pages. A given book usually requires a plurality of tabs, all of which differ from each other. It is important that such tabs be affixed to the proper pages, in the proper order. It has been common for such tabs to be affixed to the edges of selected pages manually, which is time-consuming and expensive. Also, sometimes tabs are erroneously omitted or mis-positioned. A general object of the present invention is to provide method and apparatus which will allow such tabs to be affixed very rapidly and accurately in an economic manner.

The pages of books such as diaries and address books are normally printed in large quantities, as groups of signatures, which are then cut and collated, using standard mechinery, to provide stacks of pages assembled into the same order or sequence in which they will appear in a finished book. In the production of many thousand copies of a given book, it would be theoretically possible to print many thousand copies of an individual page, and then, by using rather simple machinery, to apply a given tab such as a tab bearing the legend "JAN", to each of those pages. Then one could readjust the machine to apply tabs bearing the legend "FEB" to further thousands of differently-imprinted pages, and proceed in such a manner to affix all the tabs required for the many thousand copies of the book. But such a procedure is deemed wholly impractical because it would undesirably require that the pages be collated after application of the index tabs, and collation would be extremely difficult, if at all possible. Because of the thickness of the tabs, a stack of pages each bearing a tab at the same edge location would be much higher on one side of the stack than on the other side of the stack. One subject of the invention is to provide method and apparatus which allows tabs to be properly affixed to edges of book pages, which then can be assembled and bound in conventional manner.

The problem of providing apparatus which will properly apply tabs to edges of pages is complicated by a requirement that the right tab be affixed to the right page at the right location. Varying numbers of pages which do not require tabs are often interspersed between pages which do require tabs. Another object of the invention is to provide method and apparatus which can process the group of pages which will comprise a book and which have been collated to the sequence in which they will appear in the book, so as to apply tabs to selected pages of the group in an accurate and economical manner.

Where varying numbers of pages not to be tabbed are provided between those pages requiring tabs, one theoretically could count pages and apply tabs only when certain counts occurred, but such a method is deemed undesirable. A miscount while "January" pages were being processed would tend to cause all the tabs for succeeding months to be attached to the wrong pages. Another object of the invention is to provide method and apparatus for applying tabs wherein determination of whether a tab is affixed to a given page does not depend upon a counting of pages.

Erroneous omission of a single tab can spoil a book. Another object of the invention is to provide method and apparatus which prevents omission of tabs, by interruption of operation should a required tab fail to become affixed.

Mis-positioning of a tab also can tend to spoil a book, and another object of the invention is to provide method and apparatus which will accurately position tabs along the edges of book pages.

Another object of the invention is to provide index tab application method and apparatus which is useful to apply tabs to pages in many widely differing arrangements.

Affixing tabs at numerous different positions along the edges of pages conceivably could be done by use of servo-positioning apparatus which moved tabs being applied to various selected positions, but it is believed that such apparatus would be prohibitively expensive and undesirably complex. Another object of the invention is to provide index tab application method and apparatus which is arranged to apply tabs to edges of pages at only a single location, but which can stop or position different pages at different positions relative to that single location, so that tabs may be affixed at different positions along the edges of different pages.

A further object of the invention is to provide lengths of tab strip which carry sequences of indicia (such as the letters A to Z, or the names of the months of the year), from which lengths of strip individual tabs can be cut accurately, without accumulating error, and then automatically applied to pages. By providing indexing indicia (e.g. holes) along such strips, accurate and rapid application of tabs can be facilitated.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 3:
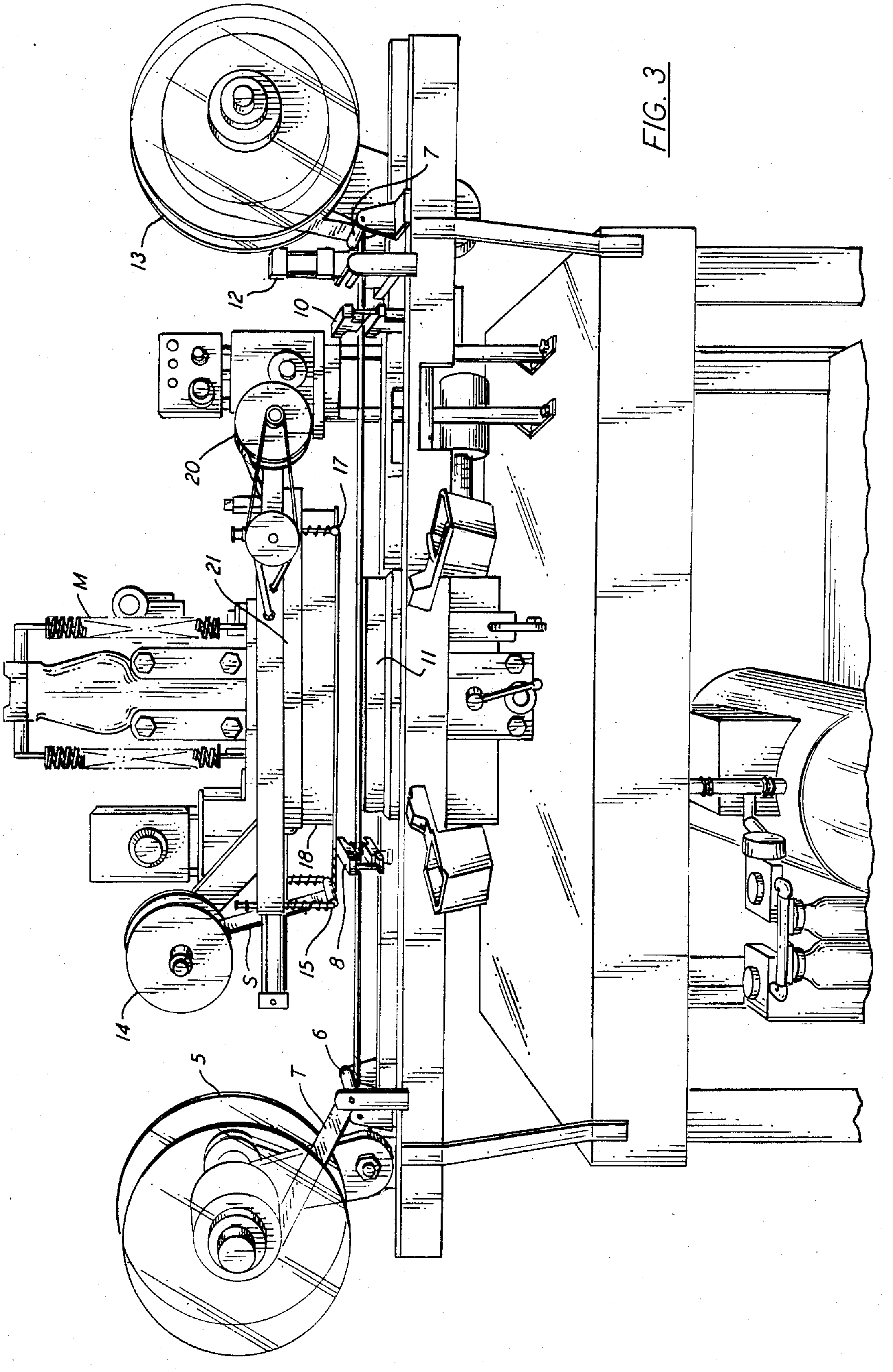
FIG. 3 is a perspective view of a strip embossing and punching apparatus of the invention.
Figure 3A:
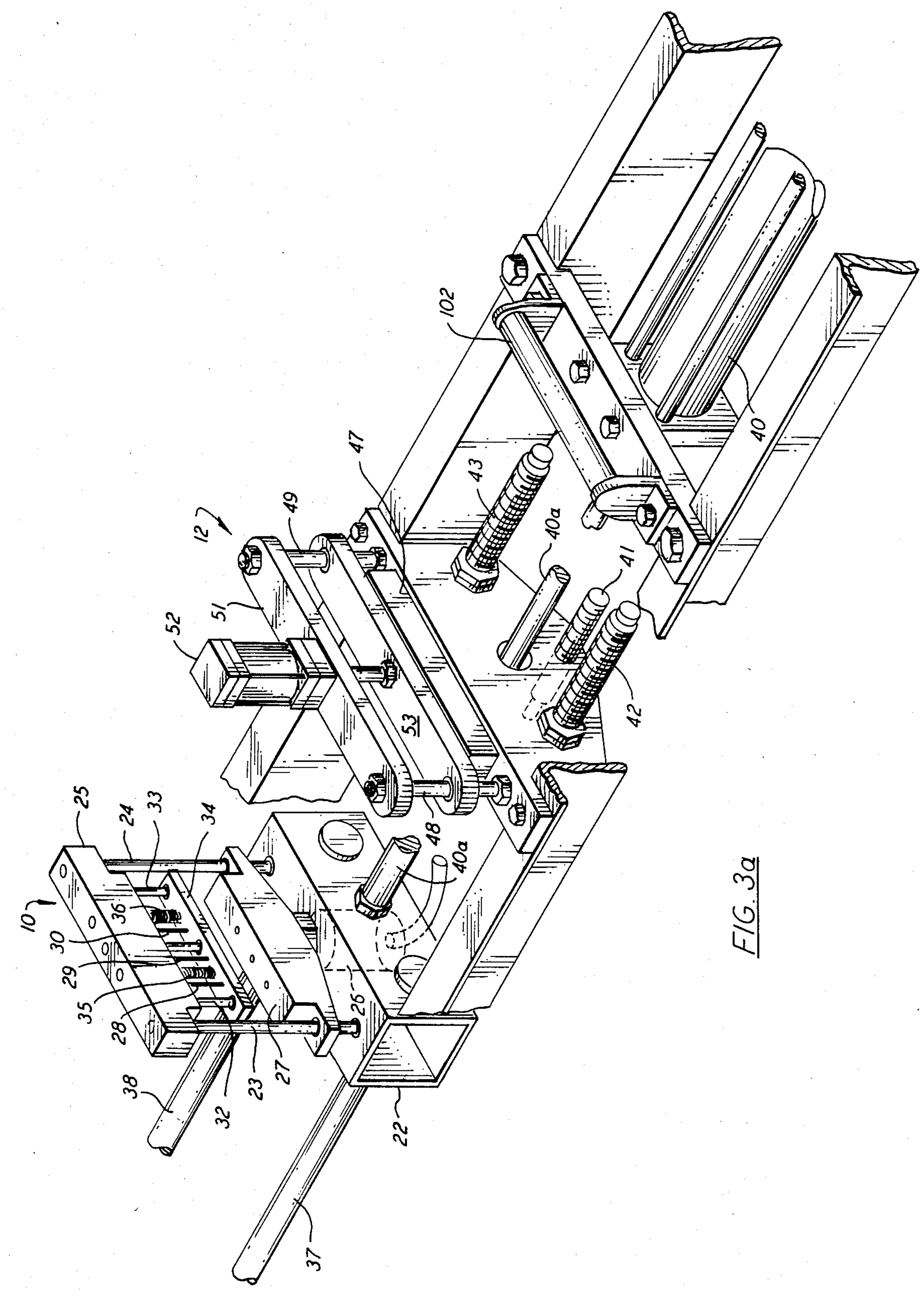

FIG. 3*a* is a diagrammatic view of strip clamping and punching apparatus used in the apparatus of FIG. 3.

Figure 4:
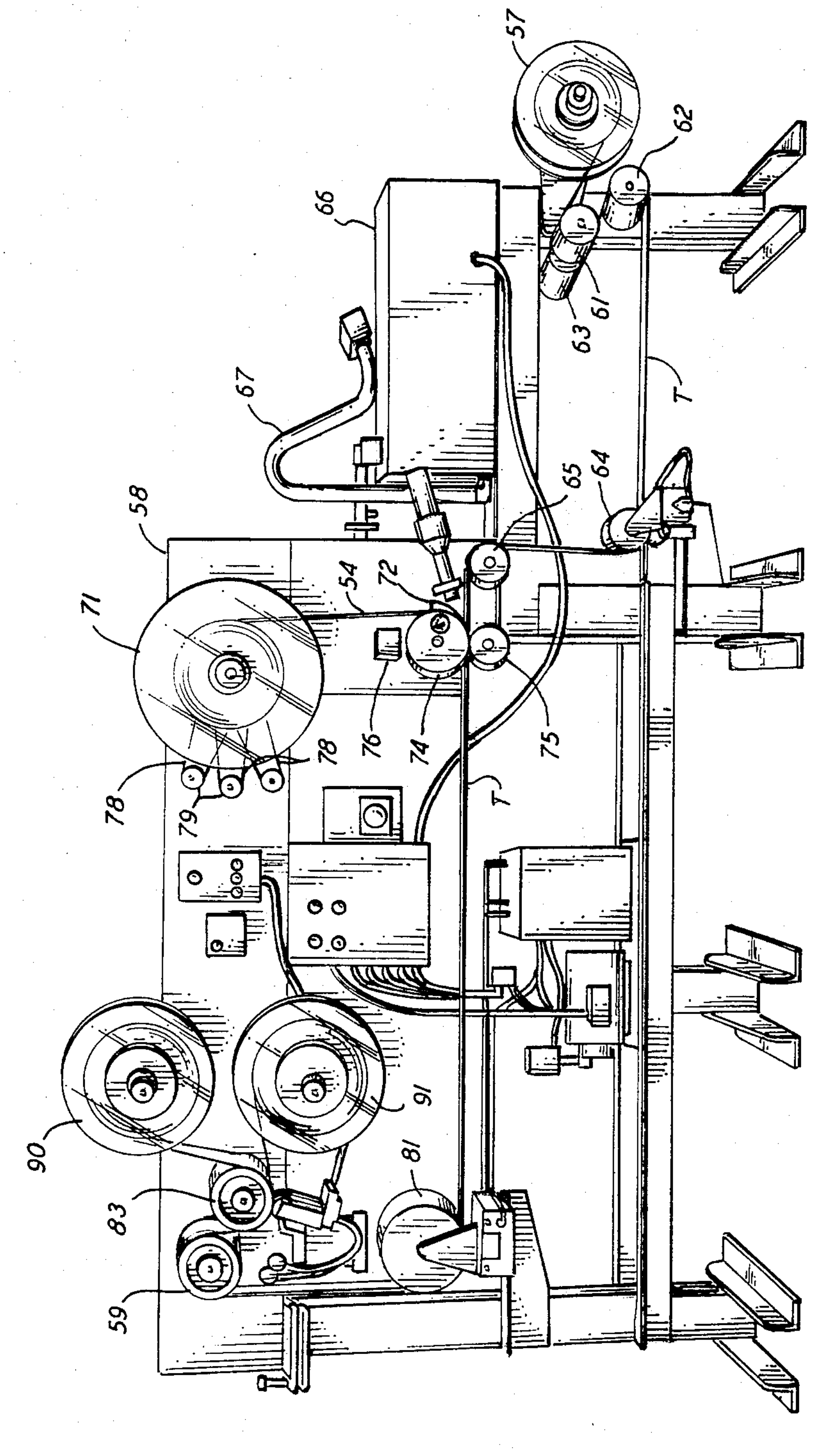
Figure 4B:
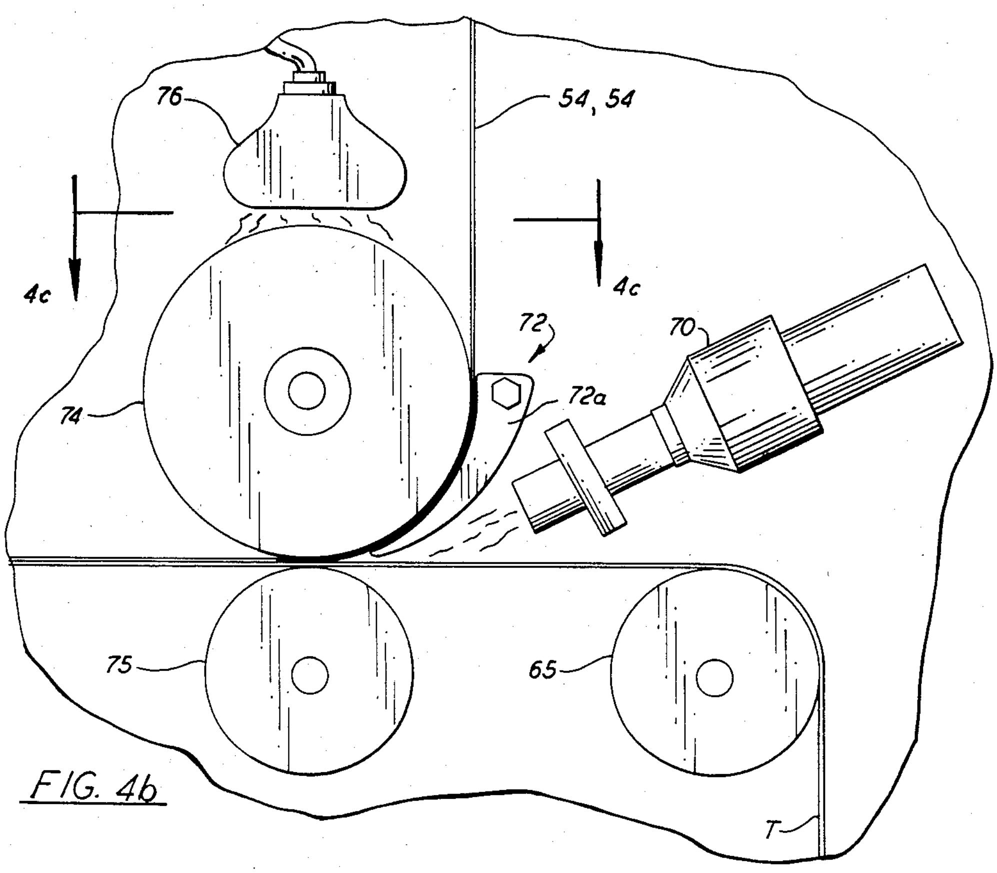
Figure 4A:
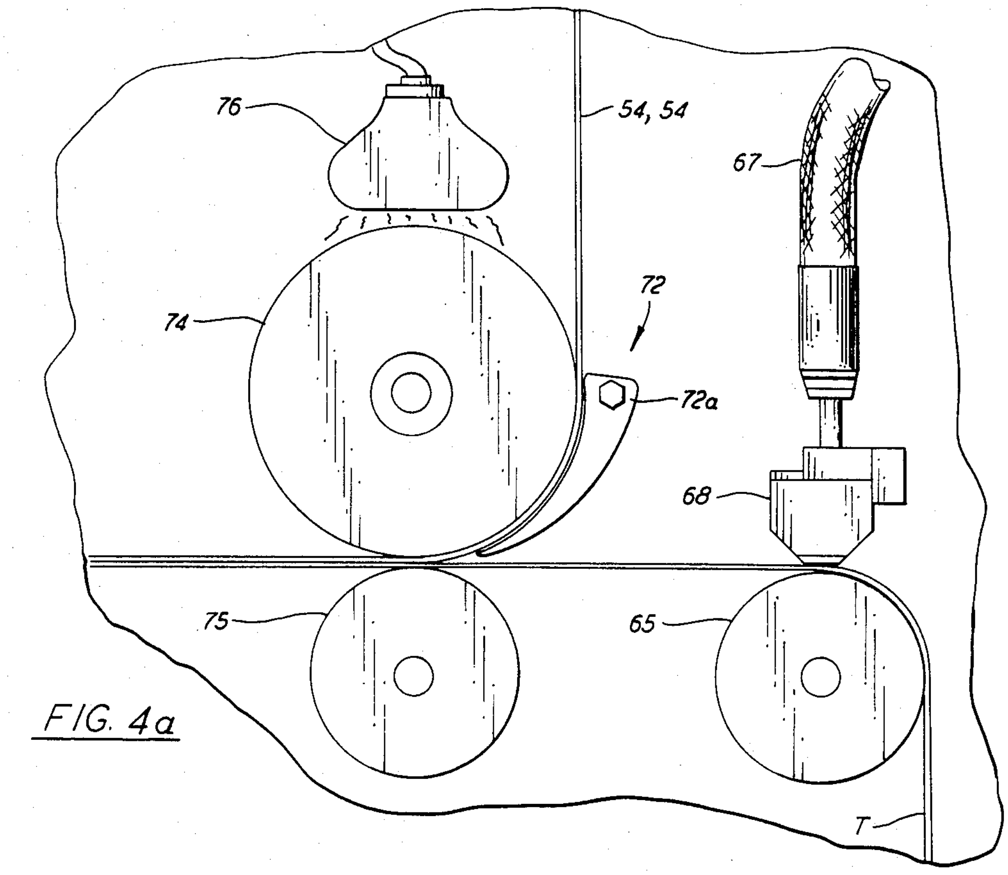
Figure 4C:
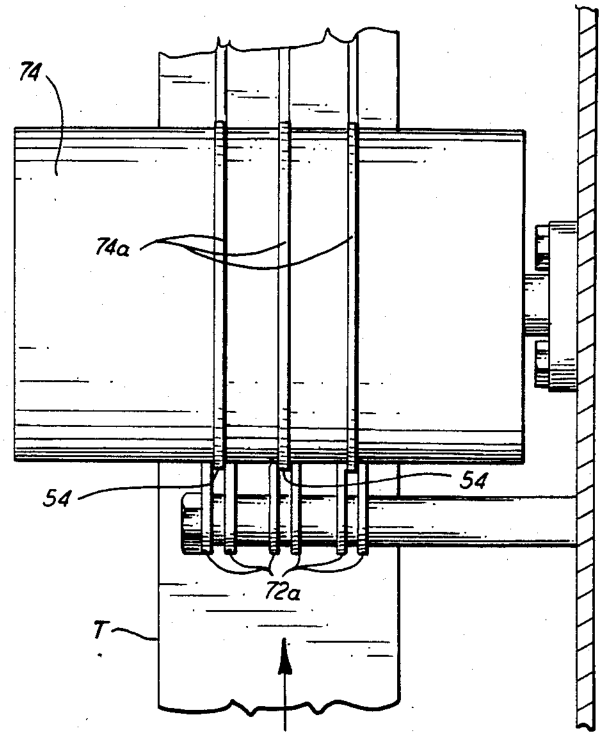
Figure 4E:
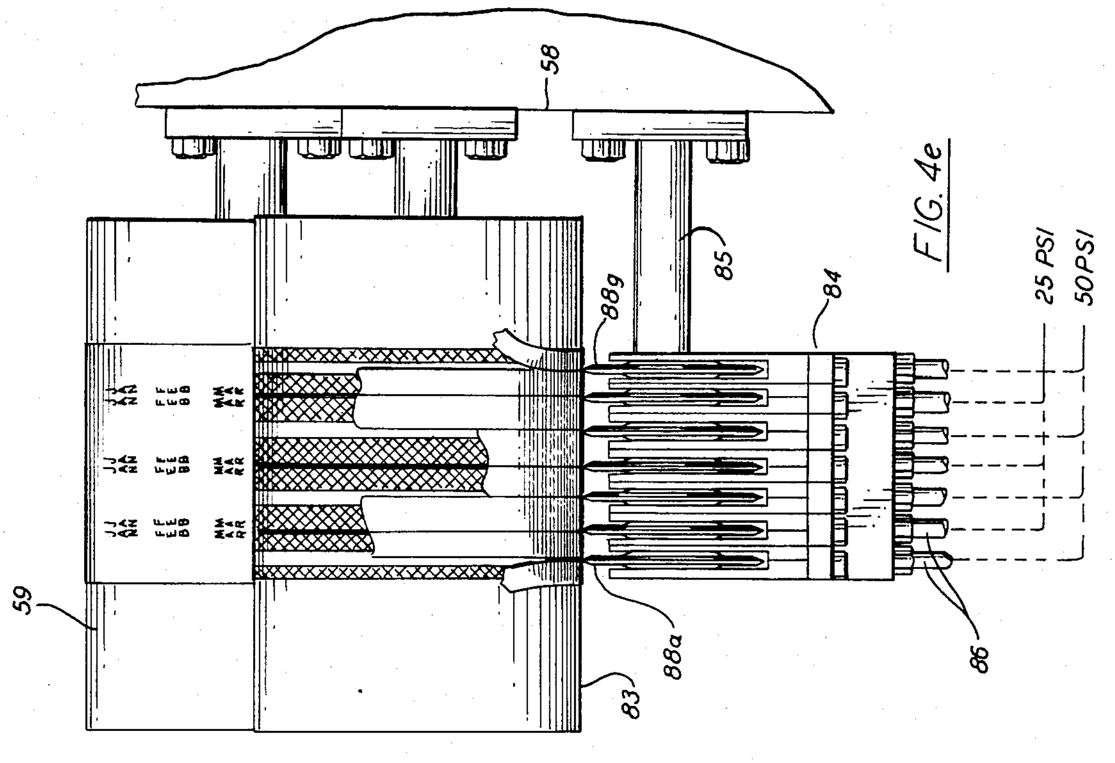
Figure 4D:
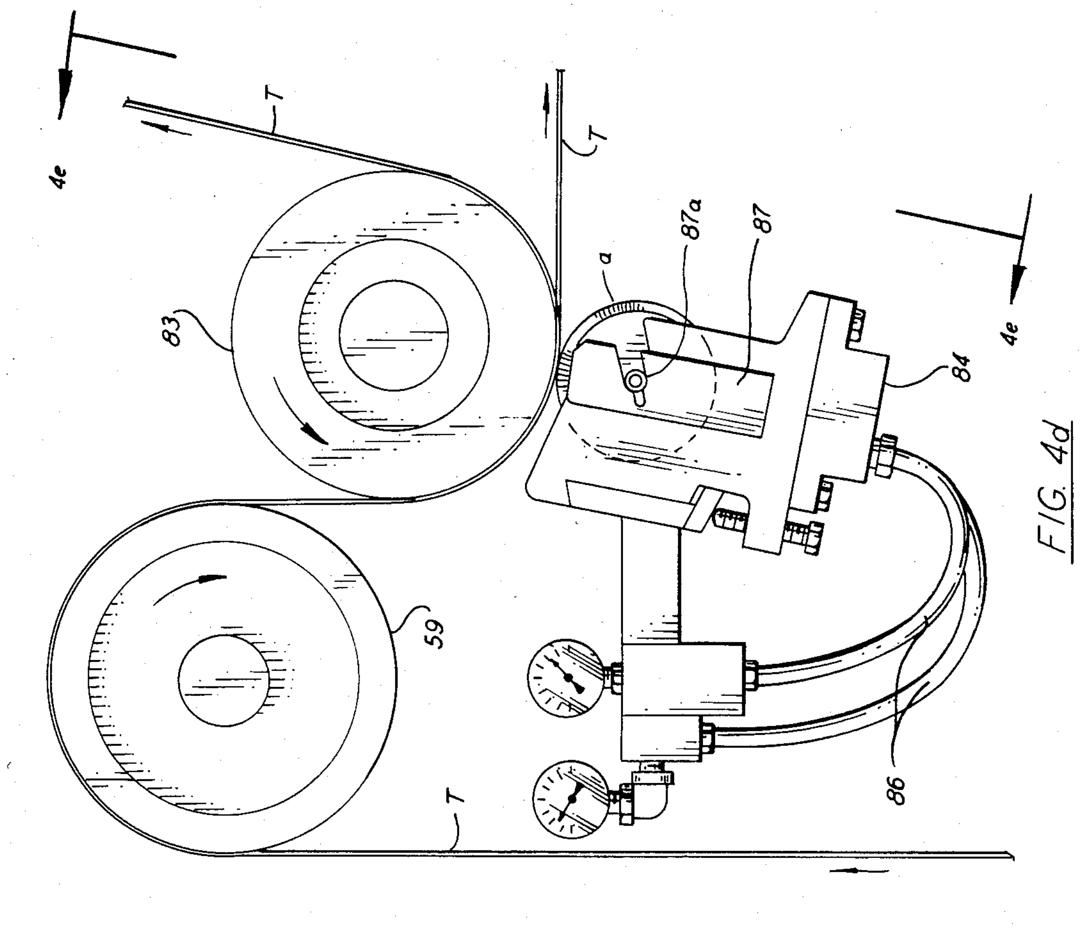

FIG. 4 is a perspective view of adhesive application, cardboard strip placement, and slitting and scoring apparatus according to the invention;

FIG. 4*a* is an enlarged view of a portion of the apparatus of FIG. 4 illustrating an arrangement used to apply adhesive to the backside of an embossed plastic-coated paper strip;

FIG. 4*b* is an enlarged view of a portion of the apparatus of FIG. 4 illustrating an arrangement used to melt adhesive on the backside of paper strip to which adhesive has been previously applied;

FIG. 4*c* is a view taken at lines 4*c*—4*c* in FIG. 4*b* illustrating a comb and roll assembly used to accurately locate and affix a plurality of narrow cardboard strips to an embossed web;

FIGS. 4*d* and 4*e* are end and side views, respectively, of a slitting and scoring assembly of the apparatus of FIG. 4, FIG. 4*e* comprising a view taken at lines 4*e*—4*e* in FIG. 4*d*.

Figure 1:
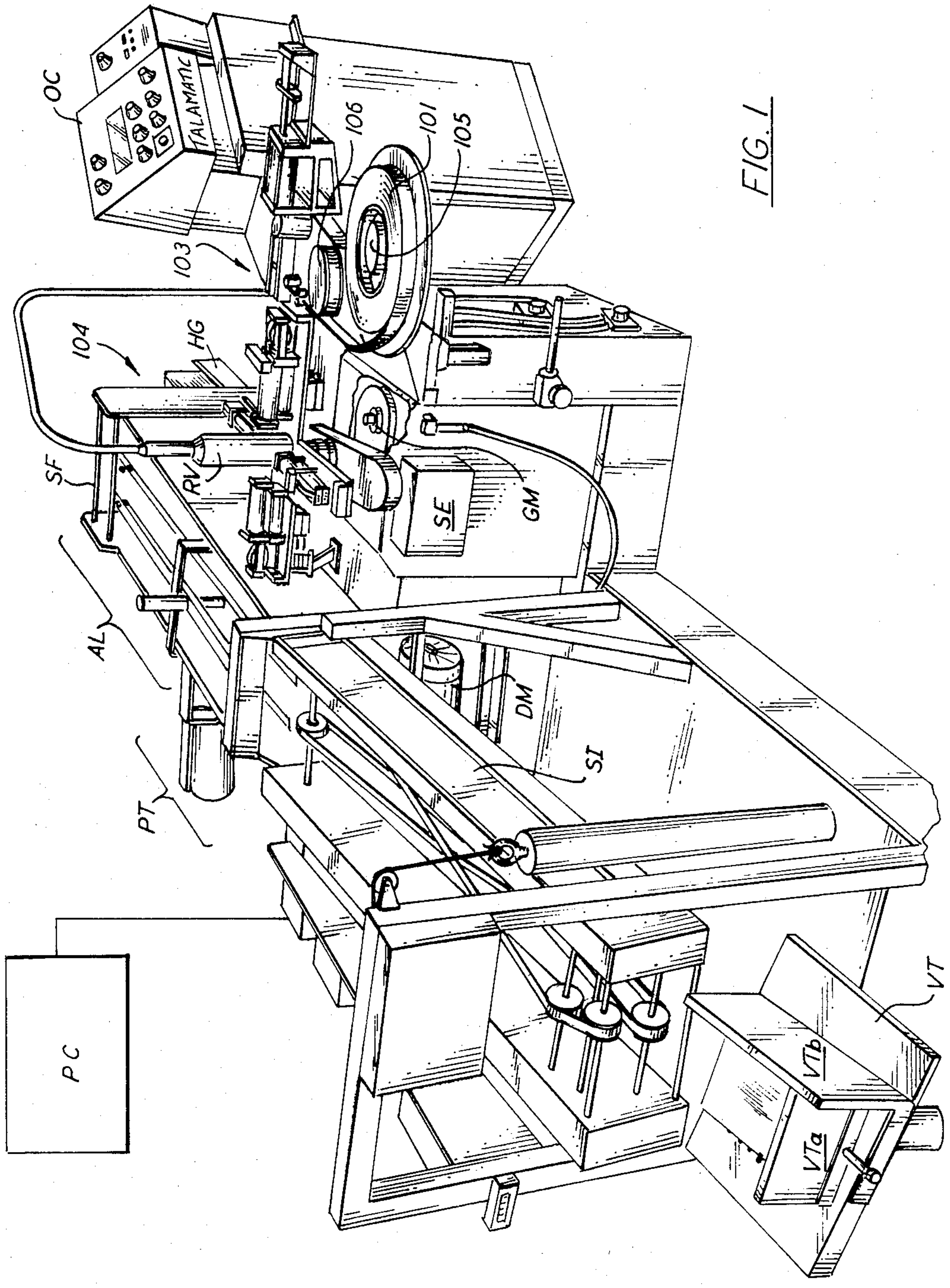
FIG. 1 is a perspective view of an exemplary index tab application apparatus according to the invention.
Figure 5:
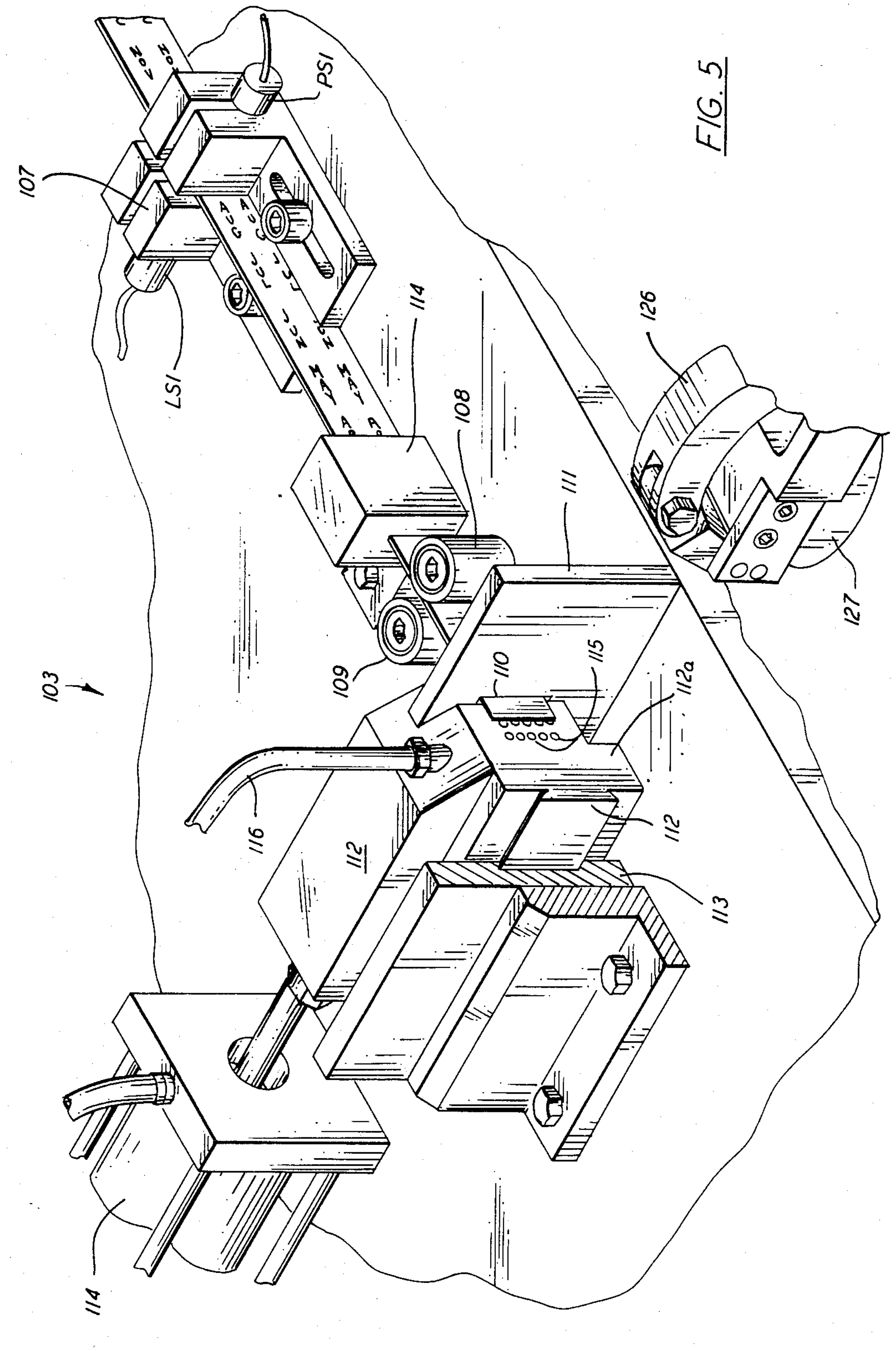

FIG. 5 is an enlarged perspective view of a tab-cutting portion of the tab application apparatus of FIG. 1.

Figure 6A:
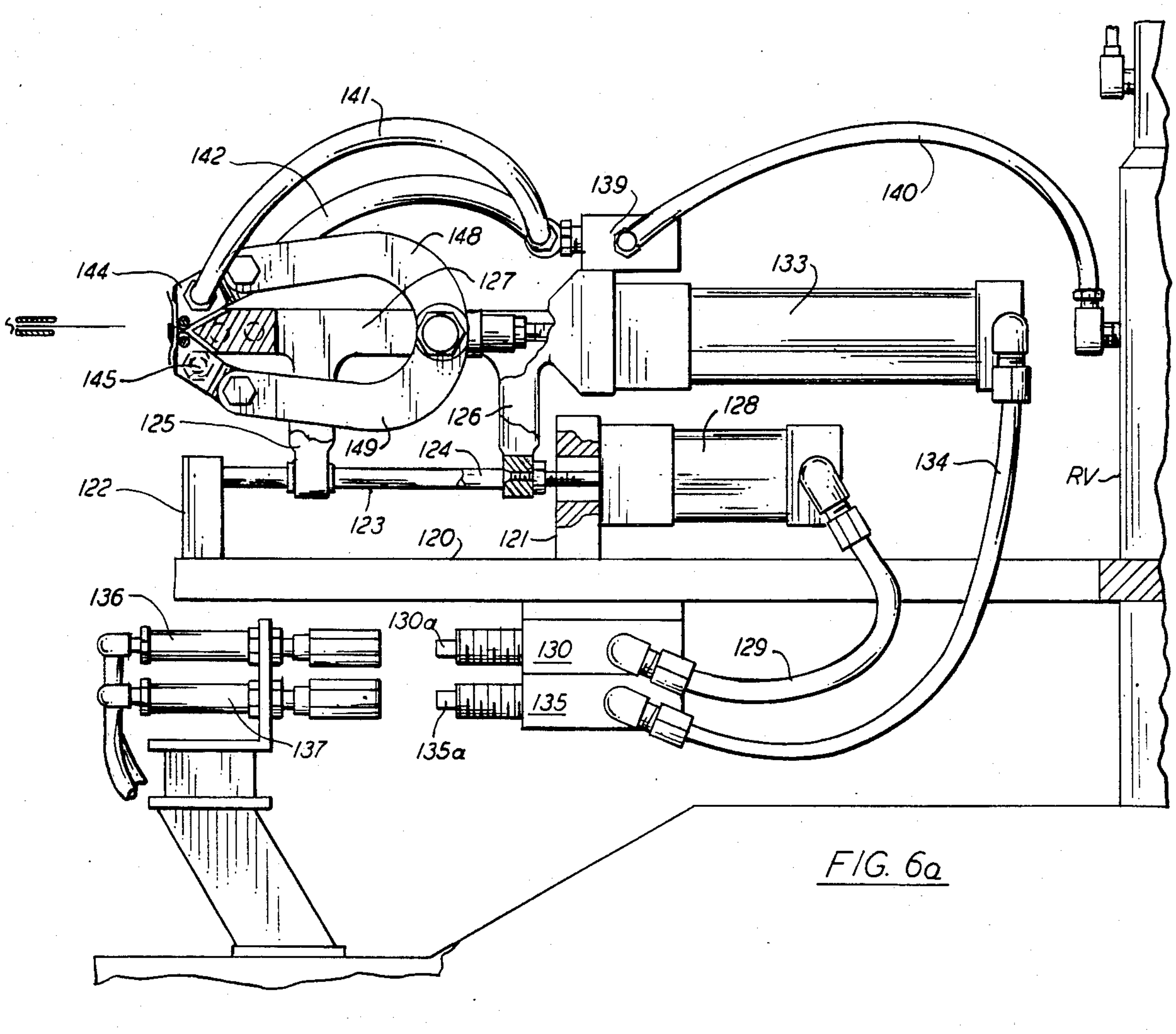
Figure 6B:
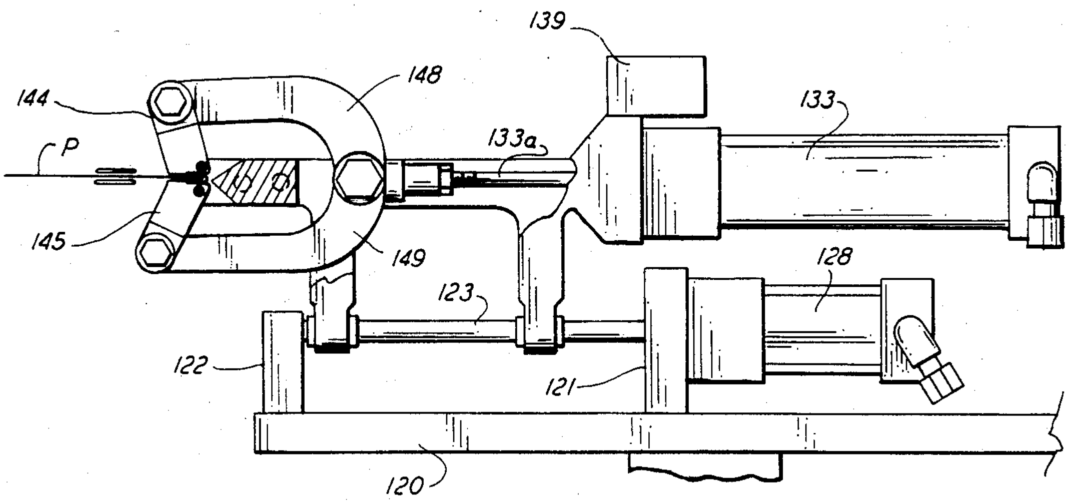
Figure 6C:
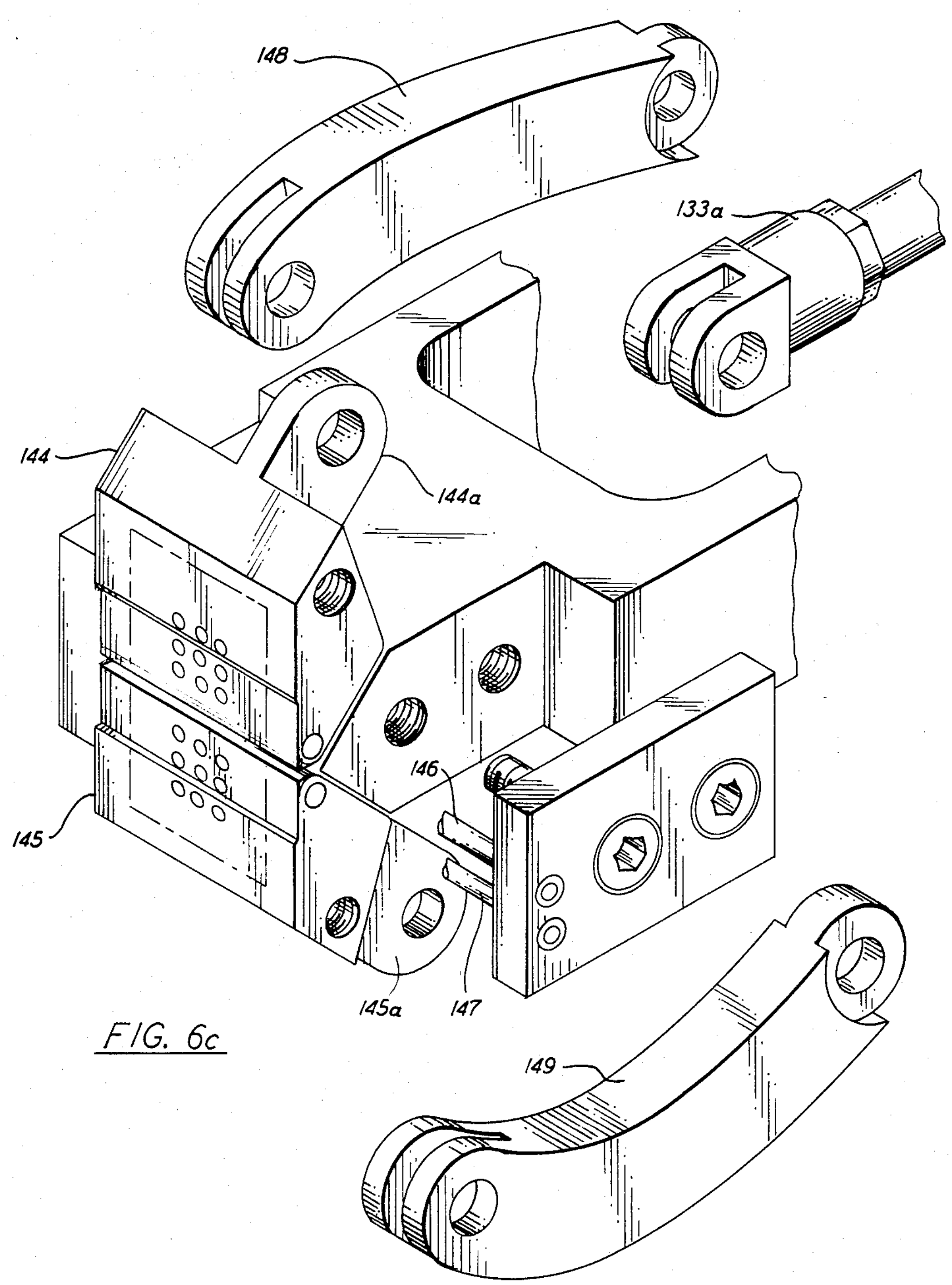

FIG. 6*a* is a side elevation view of a turntable arm portion of the apparatus of FIG. 1;

FIG. 6*b* illustrates a portion of the apparatus of FIG. 6*a* in an alternate position;

FIG. 6*c* is an exploded view of a tab holding and tab folding clamp assembly of FIGS. 1, 6*a* and 6*b*.

Figure 7A:
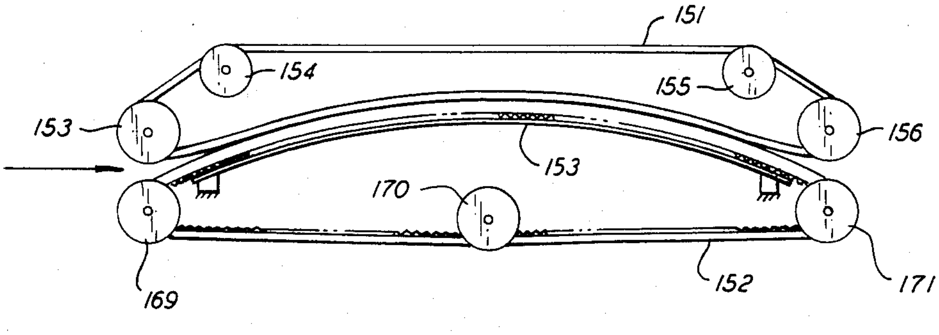
Figure 7:
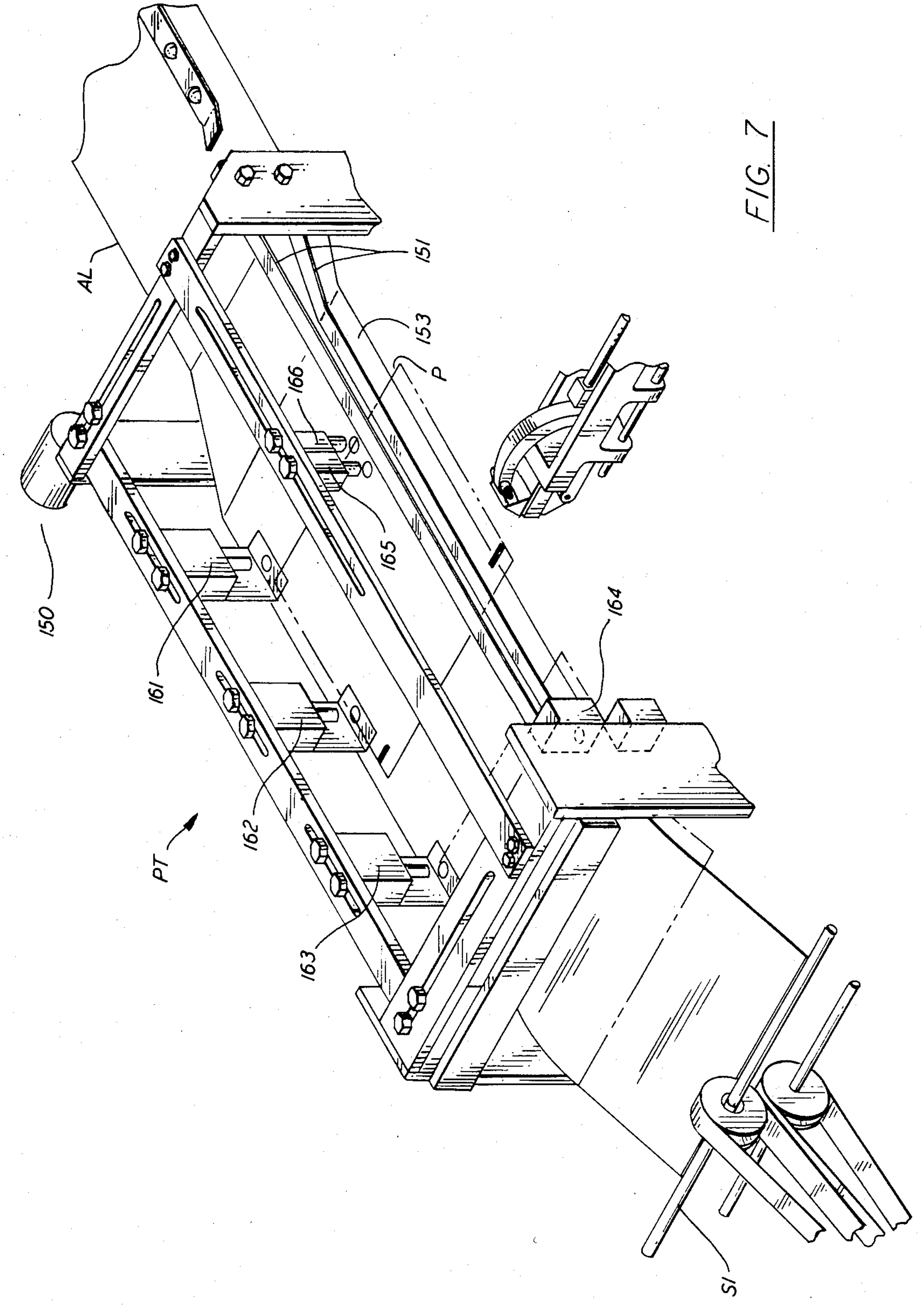

FIG. 7 is an enlarged perspective view of a paper transport portion of the tab application apparatus of FIG. 1, and FIG. 7*a* is a diagrammatic view useful in understanding operation of the paper transport portion.

Figure 2:
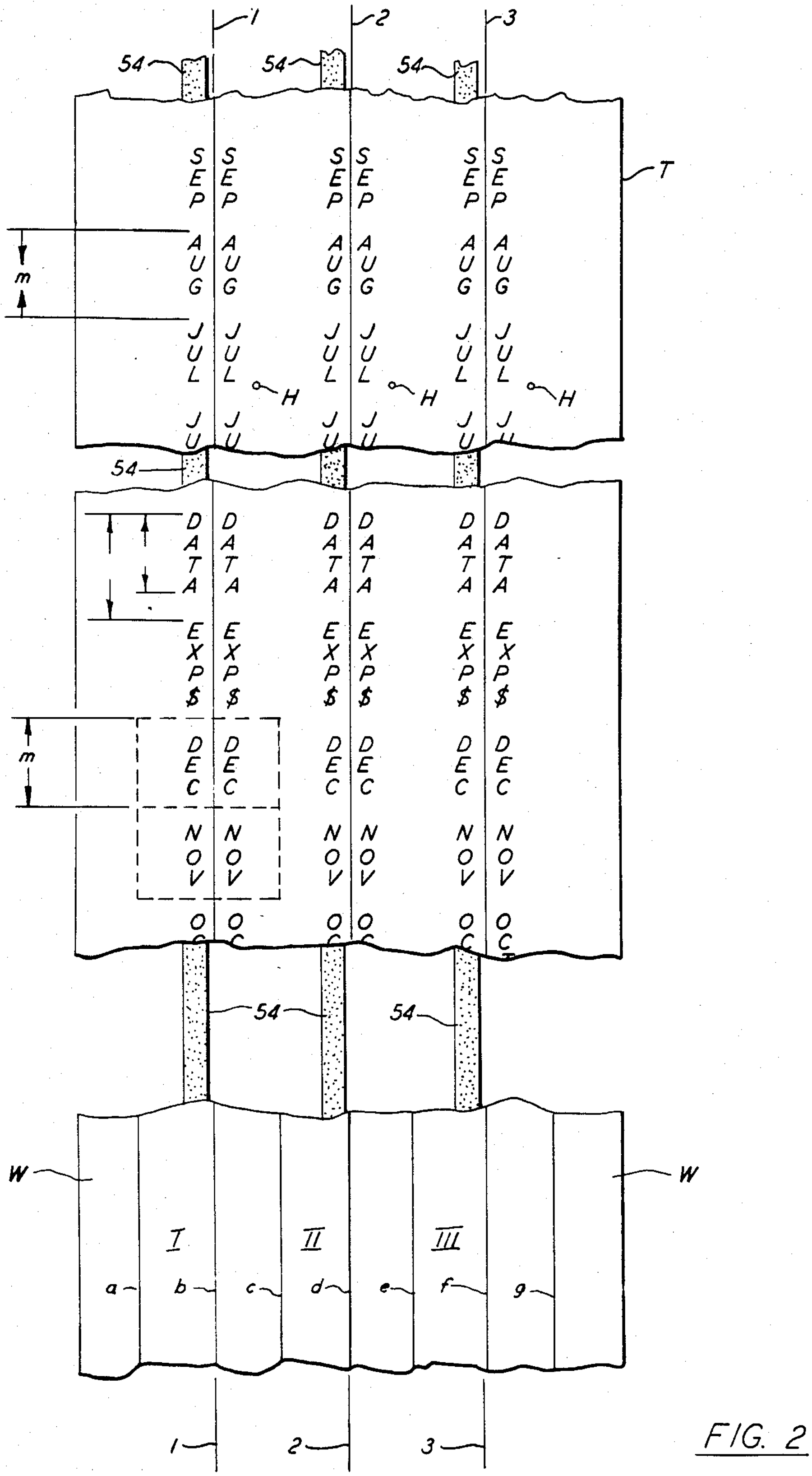
FIG. 2 is a diagram illustrating portions of an exemplary form of embossed plastic-coated paper strip having cardboard backing strips adhered thereto, which is manufactured and then further processed in accordance with the invention.

One method in accordance with the invention includes a first step of embossing a desired sequence of indicia along a tab strip, together with a related substantially simultaneous second step of punching an index hole through the tab strip at a predetermined location relative to the indicia embossed on the strip. By way of example, the tab strip T may comprise a 4-inch (10.16 cm.) wide strip of plastic coated paper having an overall thickness of 0.010 in. (0.25 mm.). A portion of tab strip T showing exemplary indicia is depicted in FIG. 2, wherein it will be seen that three double-columns of indicia extend along the strip on opposite sides of three centerlines 1, 2 and 3. It will become apparent as the description proceeds that less than three or more than three such double-columns of indicia may be embossed along a strip without departing from the principles of the invention. The exemplary embodiment will be described in connection with a diary on which twelve tabs are provided bearing 3-character abbreviations for months, and two other tabs are marked with 4-character legends, "DATA" and "EXP$". The two tabs which bear four characters are longer than the twelve monthly tabs. The indicia for successive monthly tabs may be spaced 0.66 inch (1.68 cm.) apart (dimension m in FIG. 2). Individual tabs eventually will be cut from the strip as described below. Dashed lines shown in connection with "DEC" and "NOV" in one double-column indicate the portions of the strip which will be used as two finished tabs. The height (dimension m) of each monthly tab may be 0.66 in. (1.68 cm.), and the height of the 4-character tabs may be 0.80 in. (2.03 cm.). With 14 tabs of the heights mentioned, the length of tab strip T for one year, i.e. for three diaries with the three double-columns, will be 9.50 inch (24.13 cm.).

In FIG. 2 three small index holes punched through the strip are shown at H,H adjacent the "JUL" legends and in fixed positional relationship thereto. The significance of the location of the index holes is discussed below.

The desired sequence of indicia is preferably embossed along successive portions of a continuous length of tab strip. Referring to FIGS. 3 and 3*a*, the tab strip T is unreeled from supply reel 5, guided by rollers 6 and 7 to pass between the jaws of a first releasable clamp 8, the jaws of releasable clamp-punch 10, across the top of a stationary vacuum plate 11 located in between clamps 8, 10, through a stationary clamp device 12, and to be re-reeled onto exit reel 13 after it has been embossed and punched. Conventional hot-stamping film S, such as a bronze-coated mylar film, for example, is reeled from supply reel 14, guided by rollers 15 and 17 to pass along the lower surface of a heated die 18, and re-reeled onto exit reel 20.

Die 18 carries bosses representing the entire desired sequence of indicia, and preferably a plurality of such sequences side-by-side, such as the three side-by-side sequences depicted in FIG. 2. The die is heated by an electrical heating plate 21 controlled by a thermostat (not shown) to maintain the die at a uniform temperature. The die 18, together with reels 14, 20 and the heating plate, is reciprocated vertically by conventional embossing machine means M. Such reeling of strip stock and hot-stamping tape, and periodic reciprocation of a heated die, to emboss indicia on strip stock is, as thus far described, by no means new, and indeed the embossing apparatus of the described embodiment was made by modifying a conventional embossing or "hot stamping" press, a Kensol Model K3ST, made by Kensol-Olsenmark, Inc. of Melville, N.Y.

In order to provide embossed tape which is useful for automatic application of tabs to books, it is necessary that the tab strip be moved a very exact distance between successive depressions of the die. For example, the distance along the strip between the last tab of one sequence and the first tab of the succeeding sequence must be the same as the distance between the first and second tabs of each sequence. The latter distance is, of course, fixed by the placement of the characters on the die, but the other distance is determined by lengthwise movement of the tab strip between die depressions. Hence the lengthwise movement of the tab strip in between successive impressions must be carefully controlled.

Accurate lengthwise movement of the tab strip is achieved by alternately holding the tab strip on vacuum plate 11, or by holding the tab strip by means of clamps 8 and 10 situated on opposite sides of the vacuum plate and arranged to reciprocate horizontally in unison. Referring to FIG. 3*a*, clamp-punch 10 will be seen to comprise a piece of hollow rectangular tubing 22 from which a pair of guide rods 23, 24 extend upwardly to space an upper clamp jaw or bar 25 at a fixed distance above the tubing. A lower clamp jaw or bar 27 is slidingly mounted on the guide rods, and reciprocated by actuation of a small pneumatic cylinder 26 mounted within tubing 22. Three holes are provided in the upper surface of bar 27 to receive the ends of three punch pins 28, 29 and 30 which extend downwardly from upper bar 25. A pair of guide rods 32, 33 rigidly affixed to and extending downwardly from upper bar 25 slidingly carry a stripper plate 34 having three holes through which punch pins 28–30 may extend, and a pair of compression springs 35, 36 urge plate 34 downwardly from upper bar 25. Widened heads (not shown) on the lower ends of rods 32, 33 fit in recesses on the bottom of plate 34 to retain plate 34 on the rods 32, 33. When cylinder 26 is actuated, lower bar 27 moves upwardly, first clamping the tab strip T against plate 34, then pushing plate 34 and the tab strip upwardly, so that punch pins 28–30 pierce the tab strip and enter respective holes in the upper surface of lower bar 27. Upon relief of pressure in cylinder 26, springs 35, 36 move bar 34 downwardly, so that the ends of the punch pins lie above the lower surface of bar 34, while cylinder 26, continuing in its spring-actuated downward stroke, separates bar 27 from stripper plate 34, releasing the tab strip T.

Releasable clamp 8 may take the same form as that shown for clamp-punch 10, except that clamp 8 is not provided with punch pins or a stripper plate.

A pair of rigid rods 37, 38 extend horizontally between and interconnect the tubing section 22 supporting clamp-punch 10 with the similar tubing section supporting clamp 8, thereby maintaining the two clamp assemblies 8, 10 a predetermined distance apart. The rods 37, 38 are supported by four linear bearings (not shown) mounted on the fixed base of the embossing machine, thereby allowing rods 37, 38 and the clamp assemblies 8, 10 to reciprocate horizontally. The two clamp assemblies are moved leftwardly and rightwardly as viewed in FIGS. 3 and 3*a* by extension and retraction of an air cylinder 40 (FIG. 3*a*), the rod 40*a* which is bolted to the tubing base 22 of clamp-punch 10. Rod 40*a* passes through a hole in stationary clamp 12. Extension of cylinder 40 occurs unitl its piston (not shown) reaches the limit, thereby fixing the leftward (in FIG. 3) limits of travel of clamps 8, 10. Retraction of cylinder 40 occurs until base tubing 22 of clamp-punch 10 engages a positive stop formed by micrometer screw 41, which may be adjusted to provide a very accurate stopping position. A hydraulic shock absorber means indicated at 42, 43 in FIG. 3*a* serve to decelerate retraction just before the screw stop 41 is engaged.

Stationary clamp 12 isolates the tension associated with takeup reel 13 from the strip advancement apparatus, so that such tension does not affect the distance which the strip is advanced. The stationary clamp device 12 comprises a smooth nylon base block 47. A pair of rods 48, 49 extend upwardly from the machine base to fixedly support bar 51 on which a pneumatic cylinder actuator 52 is mounted. Rods 48, 49 also guide clamp bar 53 affixed to the rod of actuator 52. The tab strip T passes between clamp bar 53 and block 47, and upon actuation of actuator 52, the strip is clamped therebetween.

The operational sequence, controlled by a conventional timer (not shown) will now be described. Clamps 8 and 10 are shown in FIG. 3 at their rightward limit positions which they reach when they have just finished pulling a fresh length of strip T across the inactivated vacuum plate. With clamps 8 and 10 in those rightward positions, vacuum first is applied to vacuum plate 11, holding the tab strip against the vacuum plate. Next as the heated embossing die 18 is being lowered, clamps 8 and 10 are released. Die 18 presses the embossing film S against tab strip T for a desired dwell time, and then the die is retracted. While die 18 dwells in its lowered position, tab strip T is held by vacuum plate 11 and clamps 8, 10 are open, not gripping the tab strip. Because the rightward limit position of clamp-punch 10 is fixed relative to die 18 and because strip T is kept taut, each trio of small holes punched by clamp-punch 10 is accurately located along the strip at a fixed relationship to the embossed indicia. Tension is applied to strip T by overdriving takeup reel 13 via a slip clutch, and backlash is avoided by activating stationary clamp 12, which remains closed at all times except when clamps 8, 10 are moving rightwardly.

As the die is retracted upwardly, cylinder 40 is extended, moving the open clamps leftwardly until the cylinder bottoms out. Next, with the clamps at their leftward limit positions, the clamps are closed to grip tab strip T, vacuum is relieved from vacuum plate 11, and then cylinder 40 is retracted, with the clamps gripping strip T and pulling a fresh length of the strip from reel 5. As cylinder 40 nears the end of its retraction stroke, lengthwise movement of the clamps is first slowed by the shock absorber means 42–43, and then base tubing 22 engages the positive stop provided by micrometer screw 41. Next, vacuum is re-applied to vacuum plate 11, clamps 8 and 10 are opened to release the tab strip, and heated die 18 is lowered to emboss the new section of strip atop the vacuum plate.

Incremental lengthwise movement of the embossing film strip S from reel 14 and underneath die 18 and reel 20 is provided by use of an air cylinder, rack and pinion and belt, none of which are shown in detail in FIG. 3, since they are all completely conventional portions of a standard embossing press.

Tabs affixed to edges of book pages must have sufficient rigidity and thickness to prevent curling, and to make them convenient for a user to manipulate. To provide such rigidity and thickness, the tabs utilize an inner filler formed of cardboard or craft paper. Strips of cardboard or craft paper equal in number (e.g. three) to the number of side-by-side sequences are adhered to the tab strip at accurate lateral distances from each other and in predetermined register with the embossed lines of indicia. In FIG. 2, three cardboard strips 54, 54 are shown spaced adjacent respective centerlines, or foldlines 1–3. Strips 54 may be 0.2 in. (0.51 cm.) wide and 0.010 in. (0.25 mm.) thick, by way of example. To affix the cardboard strips to the embossed tab strip, the "paper side" of the embossed strip, i.e. the side opposite from where the embossed indicia are carried, is first coated with a thin (e.g. 0.001–0.003 in., or 0.025–0.076 mm.) layer of a hot melt adhesive, such as Type P-1022 manufactured by Malcolm Nicol Co. of Lyndhurst, N.J. The tab strip T may be coated on its paper side with hot-melt adhesive either prior to or after the above-described embossing procedure. After the cardboard strips have been adhered to the embossed strip, the resulting assembly is slit into separate strips, each of the separate strips is scored down its middle to facilitate subsequent folding, and the separate strips are rolled up on individual reels, as will be described.

Referring to FIG. 4, tab strip T embossed as previously described is shown being fed from supply reel 57. A drive motor (not shown) on the rear of panel 58 drives a rubber-covered traction roll 59 which controls the rate at which tab strip T is pulled from reel 57. The strip passes over rolls 61 and 62 mounted near supply reel 57, and roll 61 is provided with a slip clutch 63, thereby providing constant tension in strip T between roll 61 and traction roll 59. Strip T passes around a steering roll 64 and over a further roll 65. A known form of adhesive application apparatus (e.g. Model HM XVIII made by Nordson Corp., Amherst, Ohio) shown at 66 comprises means to melt adhesive. Hot melted adhesive is forced through an electrically heated hose 67 by a pump (not shown) to spread melted adhesive on the moving strip T through a flat-slit nozzle 68 which may be adjustably spaced near roll 65, as best seen in FIG. 4*a*, to place a thin layer of molten adhesive across the strip. As previously mentioned, plastic-coated paper strip can be provided with a hot-melt adhesive coating prior to embossing, and if such strip, which is commercially available, is used, the coating apparatus 66, the hose 67, and the nozzle 68 may be eliminated, though means then must be provided to melt the preapplied adhesive before adhering the cardboard strips to the embossed strip. With such an arrangement, in addition to electrically heating roll 65, hot air is blown against strip T to melt the previously-applied adhesive, by means of a heat gun 70, as shown in FIG. 4*b*.

While the adhesive is still molten (if applied via the nozzle), or the adhesive has been re-melted by the heat gun with the alternative arrangement, three strips 54, 54 of cardboard are fed downwardly from a triple reel 71, laterally guided through comb assembly 72 and implanted in molten glue on the paper side of strip T where roll 74 engages roll 75. Roll 74 is heated to a constant temperature by radiant heat from heater 76. As best seen in FIG. 4*c*, the three strips 54, 54 of cardboard pass downwardly between pairs of stationary comb fingers 72*a*, 72*a* which control the lateral positions of the three strips. Roll 74 is provided with raised ribs 74*a*, 74*a* which force the cardboard strips 54 against strip T where strip T passes over roll 75. It has been found to be desirable to provide roll 75 with a slightly compliant surface, by covering it with a thin cardboard sleeve, for example. It is necessary to keep the cardboard strips taut to insure correct placement. To that end each of the three concentric sections of reel 71 is individually connected via a respective O-ring rubber belt 78 to a respective slip clutch 79 to provide a given retardation or drag individually for each section of the reel and consequently a given tension for each of the three cardboard strips. Rolls 65, 74 and 75 are driven in synchronization with traction roll 59 via a chain drive (not shown) mounted on the rear side of panel 58, on which the rolls are journalled.

Embossed strip T, now with three cardboard strips adhered thereto, passes horizontally from the nip between rolls 74 and 75 to a second steering roll 43, then upward and over traction roll 59, then down and around a hardened roll 83, toward which seven rolling knife discs are urged by pneumatic pressure. FIGS. 4*d* and 4*e* illustrate a known form of pneumatic slitting assembly commercially available from Arrow Converting Equipment Co., Fairfield, N.J. A stationary block 84 mounted on bar 85 contains seven passages to which seven air hoses 86, 86 are connected. Each passage extends to a recess in which a respective bar 87 is slidingly fitted. Each bar 87 contains a pair of slots 87*a* which support the axle of a respective cutting disc. The pneumatic pressure applied via a given hose 86 to a given passage determines the force with which a given knife disc of the group 88*a*–88*g* is urged generally upwardly toward hardened roll 83. The cutting discs are labelled a through g in FIG. 4*e* to correspond to the designation of cutting and scoring lines in FIG. 2. The pressure on knife discs with subscripts a, c, e and g is sufficient to provide complete cutting through strip T, while a lower pressure urging discs of subscripts b, d and f toward roll 83 results in a scoring of strip T without cutting all the way through it. The lateral positions on strip T at which the cutting and scoring is done, and the relationships of those positions to the embossed indicia and the cardboard backing strips, can be seen by reference to FIG. 2, wherein solid lines a, c, e and g indicate where the similarly-labelled (in FIG. 4*d*) knife discs cut completely through strip T, and dashed lines b, d, and f indicate where strip T has been scored partway through. Strip portions W,W outside lines a and g are discarded as waste, leaving three individual identical strips I, II, and III. Each individual strip has its score line (b, d, or f) along its geometrical centerline, close to but spaced slightly (e.g. 0.05 in. or 0.13 cm.) from one edge of its cardboard reinforcing strip 29. The two outside strips I and III are wound up (FIG. 4) on a two-section reel 90 and the central strip II is wound up on a single section reel 91. Reel 90 and reel 91 are overdriven (relative to traction reel 59) via respective slip clutches (not shown), so that the three strips are kept taut as they are wound on reels 90 and 91.

In order to provide tabbing strips which are suitable for automatic attachment of tabs to books, it is very important that the score line be laterally located exactly midway between the two lines of embossed print, and further very important that one edge of the cardboard reinforcement strip be accurately located a fixed distance from the score line. In the apparatus of FIG. 4, a known form of dual edge-guiding apparatus (Adjusta-Guide system from North American Mfg. Co., Cleveland, Ohio) was incorporated at two locations. A pneumatic edge-sensor mounted near steering roll 64 senses one edge of the embossed strip and provides a signal to a hydraulic servomechanism (not shown) which pivots the mounting of roll 64 about a vertical axis, thereby tending to maintain the sensed edge of the strip at a predetermined lateral location just prior to the cardboard strips 54 being implanted on the embossed strip. A second pneumatic edge-sensor mounted downstream from steering roll 81 senses the same edge of the strip and provides a signal to a second hydraulic servomechanism which pivots the mounting of roll 81 about a vertical axis, thereby tending to maintain the sensed edge of the strip at a predetermined lateral location just prior to slitting and scoring.

Brief Description of Application of Tabs to Pages

A brief overall description of the apparatus of FIG. 1 may be helpful prior to a detailed description of novel portions of the apparatus. To apply tabs to the edges of pages of a book being manufactured, the embossed and cardboard backed tab strip prepared as described above is unwound from a reel 101 under control of a stepping motor. A programmed length is fed along a straight line path, and a reciprocating knife assembly 103 cuts successive tabs off the lead end of the advancing strip and transfers each tab as it is cut to a tab-holding and tab-folding clamp assembly, four of which are carried on a turntable or turret assembly 104. The turntable or turret assembly includes a plurality (e.g. four) of arms which extend horizontally outwardly from a vertical central shaft, and the end of each arm carries a clamp which operates as a tab-holding means and a tab-folding means. The turntable is periodically indexed through a predetermined angular rotation, ninety degrees in the case of a turntable having four arms, by a conventional Geneva constant-to-intermittent motion converter GM driven by a variable-speed DC motor DM. As the reciprocating knife assembly 103 serves a tab from the lead end of the tab strip, the tab is transferred to and held by the tab-holding and tab-folding clamp on the end of one of the turntable arms. The tabs are held by means of vacuum generated by Venturi action on each arm of the turntable assembly from compressed air supplied via a rotary valve RV. As the tab strip is being advanced preparatory to severing the next tab, the turntable rotates to locate the clamp on the end of the next one of its arms adjacent the knife assembly so that it can similarly receive and hold that next tab. Designating the position of the end of a turntable arm adjacent the knife assembly 103 as Station I, rotation of the turntable after a clamp grips a severed tab next moves the end of the arm to Station II, where a conventional heat gun (diagrammatically indicated by a block HG in FIG. 1) blows heated air on the tab to preheat the adhesive on the tab. Further rotation of the turntable or turret then swings the end of the arm to Station III, which is adjacent a path along which successive pages of a book are fed. At Station III the tab is further heated, enough to melt-activate the adhesive on the tab, and then the tab is folded and clamped to a passing page.

After a tab is applied to a page, the page is transported from the paper transport section PT to a sheet inverter SI, which grips pages exiting from the paper transport section PT and inverts the pages as they travel through the sheet inverter. Thus the tab application machine applies a tab to the righthand side (as viewed in FIG. 1) of a page temporarily stopped in the paper transport section PT, but then inverter SI flips over each page, so that the tabs are on the left side, as is shown by pages stacked within a tilted vibrating tray VT, where pages are collected. Tray VT tilts downwardly toward two walls formed by plates VTa, VTb, and vibrating the tray insures that the pages will be stacked evenly and neatly within the tray, from which they are periodically removed by a machine operator.

Operation of the tab application machine requires that pulse trains be derived to drive the stepping motor, that a variety of control signals for valves be provided at precise instants, and that photosensor signals be processed. All of these functions can be performed in a straightforward fashion by a variety of computers or programmable controllers without the exercise of the invention. A conventional shaft encoder SE is belt-driven in synchronism with the turntable, and all timing operations performed by the programmable controller PC are based on signals supplied to the controller by the shaft encoder, which allows the tab application machine to be operated at a variety of different speeds. An operator control console OC provides displays of various operating and error conditions, and allows the operator to start, stop and vary the speed of the machine.

In FIG. 1 a conventional sheet feeder is indicated at SF.

Stacks of pages for plural books are placed in sheet feeder SF, with the pages stacked in the order in which they must appear in the book. The sheet feeder feeds sheets successively from the top of the stack into a conventional Baumfolder edge aligner AL commonly used on paper folders. The edge aligner comprises a plurality of belts running at a slight angle relative to a metal channel to urge an edge of each page into alignment with the channel. Edge-aligned sheets are passed from the aligner AL to the paper transport portion PT of the tab application machine. The pages fed to the tab application machine when a typical diary is being manufactured will include numerous pages to which tabs should not be affixed, such as those for the second and subsequent weeks of a month, and fewer pages to which tabs must be affixed, such as pages of the first day of each month, and pages which begin "DATA" and "EXP$" sections of the book. In many applications there will not be the same number of pages between successive pairs of tabbed pages. In order to determine whether a given page fed to the tabbing machine should have a tab applied to it, a mark, such as a small black square, is printed along one edge of each page to which a tab must be affixed, and no such edge marks are provided on the other pages. For the embodiment being described, marks are placed along the inside edges of pages to be tabbed, opposite from the desired locations for the tabs, preferably in a margin area devoid of other printing. To determine where along the outer edge of a page a tab should be applied, the edge mark is printed at the desired vertical location of the tab along the inner edge of the page. For example, a page to which a "JAN" tab is to be applied may have a mark near the top of its inside edge, while a page to which a "DEC" tab is to be applied may have a mark near the bottom of its inside edge. As pages pass along the paper transport section PT of the tab application machine, photosensor means check for the presence or absence of edge marks. While photosensor means were used in the embodiment being described, it is within the scope of the invention to instead print the marks to be sensed with magnetic ink, and to use magnetic ink sensors similar to the types commonly used by bank check processing.

Pages which do not bear an edge mark pass through the paper transport section of the tab application machine without stopping, but upon detection of an edge mark on a page, that page is stopped, and with the edge marks located at different locations along the edges of different pages, different pages will be stopped at different places along the paper transport section. Each page bearing an edge mark is stopped so that its edge mark is located at the single tab application location along the paper transport section at which the tab application machine can apply tabs. Then the tab application machine can apply a tab at the correct vertical location, as will be shown below.

Referring to FIG. 1, an embossed, scored and cardboard-reinforced tab strip prepared as previously described is unwound from reel 101, which is shown mounted to rotate about a vertical axis. Reel 101 is provided with a central slip clutch 105 to provide a predetermined tension in the tab strip. An idler wheel 106 having upper and lower flanges guides the tab strip to a first slotted bracket 107 which is shown in FIG. 5, and which carries a photosensor PS1 and a light source LS1. The photosensor is mounted at an elevation such that it can sense the passing of each hole (H, FIG. 2) which was punched through the tab strip during the embossing and punching process described above. The tab strip then extends through another slotted guide member 114 and between a pair of transport rolls 108, 109, one (108) of which is smooth and one (109) of which has a knurled surface. Transport roll 109 is driven by a stepping motor via a timing belt (not shown) and the knurled surface of roll 109 engages the cardboard reinforcing extending along the tab strip. Rolls 108, 109 feed the strip through slot 110 in lapped hardened stationary knife block 111, and a preprogrammed length of strip corresponding to one tab is periodically fed through slot 110.

A knife block 112 guided by block 111 and by ways 112 engaging a guide block 113 is reciprocated by a stationary double-ended pneumatic cylinder 114. The forward end of the rod of cylinder 114 is attached to knife block 112. The rear end (not shown) of the rod at the other end of cylinder 114 is attached to a plate (not shown) which moves between shock absorbers to cushion the terminal portions of the forward and return strokes of the cylinder. The rearward limit position of cylinder 114 places the forward face of 112*a* of knife block 112 just rearwardly of slot 110. Face 112*a* of knife block 112 is provided with a plurality of small holes 115, 115 which are connected via passages in block 112 and a flexible hose 116 and a solenoid valve (not shown) to a vacuum source (not shown).

With the knife retracted, the programmable controller PC (FIG. 1) first advances the strip drive stepping motor a given number of steps, so that the transport rolls 108, 109 feed the required length of tab strip equal to one tab through slot 110, past the cutting edge of the knife, the edge of face 112*a* which slides against block 111. Then vacuum is applied to holes 115 of the knife face, immobilizing the tab strip against the knife face. Next the knife block moves rapidly forward, immediately shearing off a tab as the knife begins its forward motion, and then moving the tab forward, about 2 inches (5.08 cm.) in the embodiment being described, to transfer the tab to an open clamp of the turntable arm then positioned adjacent the knife at Station I. As the vacuum on the knife face 112*a* is broken, the tab is held by the turntable clamp. The knife block then returns to its retracted position, and the turntable clamp bearing the just-severed tab swings to Station II.

If the book being assembled is to have 26 tabs of equal length, by way of example, such as the number of an address book might have, the controller is arranged to move the tab strip through a fixed length 25 times, just prior to 25 tabs being cut from the strip, by applying a predetermined number of stepping pulses to the strip drive stepping motor, but just prior to the 26th tab being cut, the stepping motor is actuated to advance the tab strip, not for a predetermined number of pulses or steps, but until the photosensor PS1 senses a hole in the tab strip. Thus the position of each sequence of tabs relative to the location of the cutting edge of the knife is established prior to each sequence being cut into individual tabs, and accumulation of error is avoided. If the tab strip were advanced a predetermined number of steps prior to every tab being cut, an extremely minute discrepancy between the distance of advance and the spacing of the indicia on the strip could accumulate, so that after many tabs were cut, the machine would be cutting the tabs at grossly incorrect places, such as in their middles. With the described arrangement where holes along the tab strip are sensed, such a problem is wholly obviated.

It also should be noted that with photosensor PS1 mounted a fixed distance from knife block 110, the sensing of a hole by photosensor PS1 indicates that a particular tab in the sequence is then positioned in the knife assembly, which means in turn that the tab for the preceding month is at Station II, and that the tab for the next preceding month is at the tab application location (Station III). Thus photosensor PS1 also serves as means for sensing whether a particular tab of the sequence will be the next tab to be applied to a page.

The four arms of the turntable assembly may be identical, and each may take the form illustrated in FIGS. *6a*, *6b* and *6c*. Referring to FIG. *6a* a rigid base member 120 extending horizontally from the intermittent output shaft of the Geneva drive carries a pair of pedestals 121, 122, between which a pair of rods 123, 124 extend, rod 123 being shown partially cut away in FIG. *6a*. Rods 123, 124 slidingly support depending front and rear legs 125, 126 of a sled member 127. The rod of air cylinder 128 is bolted to rear leg 126 of the sled member, and hence actuation of cylinder 128 can move the sled member rightwardly and leftwardly (as viewed in FIG. *6c*) along rods 123, 124. Cylinder 128 is connected via hose 129 to a valve 130, which is operated only when its pin 130*a* is pushed inwardly. The rear end of sled member 127 carries air cylinder 133 which is connected via hose 134 to be actuated only when pin 135*a* of valve 135 is pushed inwardly. Valves 130 and 135 are operated by respective air cylinders 136, 137 located at Station III, and hence cylinders 128 and 133 on a turntable arm can be operated only when that turntable arm has been indexed to Station III.

Sled member 127 also carries a vacuum jet 139 which is connected to a source of compressed air via hose 140, and hoses 141 and 142 connect vacuum to upper and lower jaw members 144, 145 of the clamp assembly each of which contains an internal cavity. As shown in FIG. *6c*, each of the jaw members 144, 145 has a face carrying a plurality of small holes to which the vacuum extends, and application of vacuum to a given tab holding and tab folding clamp serves to hold a tab tightly against the clamp, from the time the tab is placed there by the knife assembly, until after the tab has been folded around the edge of a page.

In FIG. *6a* sled member 127 is shown retracted rightwardly, in the position it has when the knife block 112 transfers a tab to it at Station I, while it travels to Station II for heating, and while it travels to Station III. At Station III the sled member is moved forwardly (leftwardly in FIG. *6a*) to the position shown in FIG. *6b*, and then cylinder 133 is actuated, so that jaw members 144, 145 fold the tab around the edge of a page P then stopped at Station III.

Operation of each tab-folding clamp can be better understood by reference to FIG. *6c*. Sled member 127 comprises a yoke-shaped member, between the fingers of which pins 146 and 147 extend, pin 146 pivotally supporting upper jaw member 144 and pin 147 pivotally supporting lower jaw member 145. Upper jaw member 144 includes a tab portion 144*a* which is pivotally connected to the forward end of upper link 148 by means of a pin (not shown). Lower jaw member 145 includes a similar tab portion 145*a* which is pivotally connected to the forward end of lower link 149 by means of a pin (not shown). The rear ends of links 148 and 149 are both pivotally connected by means of a pin (not shown) to the forward end of rod 133*a* of cylinder 133. Thus as cylinder 133 is extended, links 148, 149 move forwardly, rotating jaw members 144, 145 about the axes of pins 146, 147 respectively. The elevation of the four tab holding and tab folding clamps on the turntable assembly is arranged relative to the knife assembly at 103 (FIG. 5) so that upon transfer of a tab from the face 112*a* of the knife assembly to a tab holding and tab folding clamp, the score line across the tab will be located midway vertically between the upper and lower jaw pivot axes defined by pins 146, 147, and then subsequent rotation of jaw members 144, 145 after the tab arrives at Station III easily folds the tab at the score line. It is important that jaws 144 and 145 pivot about two mutually-different spaced-apart axes, in order that the pressure applied by the jaws be distributed over the entire area of each tab, and so that clamping of the tab on the edge of a page will not tend to slide the cardboard backing strip relative to the remainder of the tab.

When a tab holding and tab folding clamp has arrived at Station III, and a page has stopped, the controller first actuates cylinder 136, thereby to actuate cylinder 128 and advance the sled member 127 leftwardly (in FIG. 6a). Then the controller actuates cylinder 137 to actuate cylinder 133 to rotate the jaws 144, 145 to clamp the tab on the edge of the page. Next the controller retracts cylinder 133 to open the jaws, and then cylinder 128 is retracted to retract the sled assembly.

Referring now to FIG. 7, as a page P leaves the conventional edge aligner AL and enters the paper transport section PT of the invention, it is important that the page be maintained in alignment as the page proceeds through the paper transport section PT, both before and after a tab is attached to the page, and an edge of each page must be unobstructed, in case a tab must be folded over the edge. As an aligned page is leaving aligner AL, it is gripped by two narrow belts running over a slightly convex surface plate, as diagrammatically illustrated in FIG. 7a. A stationary arcuate upwardly convex plate 153 is shown with a greatly exaggerated curvature in FIG. 7a, a radius of curvature of the order of 8–12 feet (2.44–3.66 m.) actually having been used. A lower belt 152 comprising an endless toothed rubber timing belt is shown trained around pulleys 169–171, with the upper course of the belt sliding across the upper surface of convex plate 153. The portion of plate 153 over which belt 152 slides is preferably covered with a thin layer of ptfe("Teflon"), and paraffin may be periodically applied to the belt to minimize wear. A flat rubber endless upper belt 151 is shown trained around pulleys 154–157 with its lower course engaging the upper surface of belt 152 along much of the length of convex plate 153. Flat upper belt 151 hugs lower belt 152 over a span exceeding a typical page height, so that the belts function as a synchronously moving clamp, preserving alignment and lateral position of a page as it is moved through the paper transport PT. Lower belt 152 is driven by a stepping motor 150 and upper belt 151 is carried on idler pulleys, being driven by its engagement with belt 152.

As belts 151, 152 transport a page, the outer edge of the page where a tab may be applied protrudes about 0.50 inch (1.27 cm.) beyond the edges of the belts. Reflecting photosensors are provided at 161, 162, 163. Transmitting light source/sensor devices are provided at 164, 165 and 166. Sensor 161 is located ahead or upstream of the tab application location, and when it senses a mark on the inner edge of a page, it provides a signal which causes the programmable controller to slow the paper drive stepping motor to a low speed. Shortly thereafter sensor 162 senses the mark and provides a signal which stops the paper drive stepping motor. Sensor 162 is preferably stationed directly across the page from the tab application location. As soon as the page is stopped, the controller operates cylinders 128 and 133 as previously described to snap a tab around the edge of the page.

Reflecting photosensor 163 and transmission photosensor 164 are located downstream from the tab application location, directly across from each other. As a page moves under sensors 163 and 164, sensor 163 provides a signal if a mark is detected on the inner edge of the page, indicating that a tab should have been applied. If passage of light to sensor 164 is not then obscured by a tab having been attached to the outer edge of the page, the combination of signals from sensors 163 and 164 allows the controller to stop the machine.

The two transmission photosensors at 165, 166 function to determine whether the correct tab is being applied to the correct page. As was previously discussed, a signal from photosensor PS1 occurs when the tab for a given month is located at the tab application location, Station III. Because the pages to be tabbed for different months are stopped at different locations relative to the tab application location after their marks are sensed, the position of the trailing edge of a stopped page is an indicator of what tab of the sequence should be affixed to that page. Photosensors 165 and 166 are located so that the trailing edge of the stopped page will lie horizontally in between them, i.e. so that one will receive light and the other will not receive light, only when a stopped page is in the stopped page location pertaining to a given month; at other stopped page positions either both photosensors 165, 166 will receive light or neither of those two photosensors will receive light. Thus when a signal is received from photosensor PS1 from detection of a hole, forward photosensor 165 should furnish an "off" signal and trailing photosensor 166 should furnish an "on" signal. If those signal conditions do not pertain when photosensor PS1 senses a hole, it means that a tab for the wrong month is being applied to a page, and simple logic circuitry in the controller responsive to those three photosensor signals provides error signals to stop the tab application machine and actuate an alarm.

It is within the scope of the invention to provide edge marks along the outer edges rather than the inner edges of pages to be tabbed, and then an applied tab can cover the mark which was sensed to cause stopping of the page and application of the tab. Such operation can be achieved by simply moving several of the photosensors. A photosensor cannot be located conveniently at the tab application location, but if it is mounted slightly upstream therefrom, it can signal detection of a mark, and then the stepping motor can be sent a predetermined number of pulses to move the page a predetermined distance before the page is stopped, locating the mark at the tab application location.

While the invention has been described in connection with use of a heat-activated adhesive, and while the use of that type of adhesive is preferred, it clearly should be understood that it is within the scope of the invention to utilize instead a moisture-activated adhesive. An adhesive activator such as a hot water spray or a steam jet (not shown) may be used in lieu of the heat adhesive-activating devices, both adjacent roll 74 (FIG. 4) and at Station II.

While the embossing method and apparatus described in connection with FIGS. 3 and 3a have been described in connection with the making of index tabs for book pages, it should be noted that they are applicable as well to other products wherein embossed or imprinted indicia must be accurately located along a strip.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of affixing tabs to edges of pages at different locations along the edges which comprises the steps of: transporting individual tabs from a series of sequences of tabs in a predetermined sequence to a predetermined tab application location, successive tabs in each sequence differing from each other; transporting a succession of pages to and beyond said tab application location; sensing marks along an edge of various of said pages; stopping each page from which a mark is sensed so that said mark is located at said tab application location; and applying the tab which has been transported to said tab application location to an edge of the page stopped with its mark located at said tab application location.

2. The method according to claim 1 which includes the steps of sensing certain tabs of said series of sequences of tabs to determine when a particular tab in each of said sequences should be located at said tab application location; and providing an error signal if a page is not stopped at a particular position relative to said tab application location when said certain tabs are sensed.

3. The method of claim 1 which includes the steps of sensing marks on pages as pages are being transported with their marks leaving said tab application location, sensing the presence of tabs as tabs are being transported beyond said tab application location; and signalling an error if the sensing of a mark does not coincide with the sensing of a tab.

4. The method of claim 1 which includes the steps of advancing a continuous strip; and cutting successive tabs from an end of said continuous strip.

5. The method of claim 1 which includes the step of activating an adhesive on each of said tabs as said tabs are individually transported to said tab application location.

6. The method of claim 1 wherein said marks are carried along a first edge of said various pages and wherein said tabs are applied to a second edge of said various pages, said second edges being opposite from said first edges.

7. The method according to claim 2 which comprises sensing an edge of a stopped page to determine whether the page is stopped at said particular position relative to said tab application location.

8. The method of affixing index tabs to edges of pages which comprises the steps of: imprinting a plurality of sequences of mutually-differing items of indicia along a generally flat first strip; advancing said first strip and cutting successive generally flat tab portions from the end of said first strip; activating an adhesive on one side of each of said tab portions; transporting each of said tab portions to a tab application location; advancing a plurality of pages to and past said tab application location and momentarily stopping selected ones of said pages at said tab application location; and folding a tab portion over an edge of each page momentarily stopped at said tab application location.

9. The method of claim 8 which includes the step of providing a plurality of sensible marks along said first strip, with each sensible mark having a predetermined spacing relative to a respective one of said sequences of indicia, and wherein said step of advancing said strip includes a plurality of steps of advancing said strip through a predetermined distance, and a step of advancing said strip until one of said sensible marks reaches a predetermined location.

10. The method of claim 8 which includes the steps of adhering a reinforcing strip along said imprinted first strip.

11. The method of claim 8 which includes the steps of applying marks to said selected ones of said pages prior to transporting said pages to said tab application location; and sensing said marks as pages are transported to said tab application location.

12. The method of claim 8 wherein said folding step comprises the steps of applying vacuum to surfaces of first and second members to hold said tab portion against said surfaces; and rotating said first and second members while said tab portion is held against said surfaces.

13. The method of claim 10 which includes the step of applying an adhesive to said first strip after said imprinting step and before said adhering step.

14. The method of claim 10 which includes the step of heating an adhesive on said first strip prior to adhering said reinforcing strip to said first strip.

15. The method of claim 10 which includes the step of scoring said first strip along a line parallel to and spaced from where an edge of said reinforcing strip extends along said first strip; and wherein said folding step comprises folding said tab portion where the scored line extends across said tab portion.

16. The method of claim 12 wherein said step of rotating comprises rotating said surfaces about first and second mutually-parallel spaced-apart axes.

17. The method of affixing tabs along the edges of selected sheets which comprises the steps of: indexing a turret means to move a tab-gripping and folding means successively from a first work station at which a tab is cut from a supply of tab stock, to a second work station at which adhesive bearing portions of said tab are activated, to a third work station; translating said sheets successively in a first direction across a table surface with a first edge of each such sheet protruding beyond an edge of said table surface; stopping each selected sheet at a position on said table surface determined by the position of a sensible indicium carried on the sheet, thereby to position a selected portion of said first edge of said sheet adjacent said third work station; translating said tab-gripping and folding means toward said first edge of the sheet; clamping said adhesive-bearing portions of said tab at said first edge of the sheet on opposite sides of said sheet; and releasing said tab while said turrent means is stopped with said tab-gripping means at said third work station.

18. The method of claim 17 which includes optically sensing said tab and said indicium when said sheet has been further advanced in said first direction to verify that said tab has been affixed.

19. The method of claim 17 wherein said turret means includes a plurality of said tab gripping and folding means, whereby indexing said turret means simultaneously advances different ones of said tab gripping and folding means to respective ones of said work stations.

20. Apparatus for affixing adhesive-bearing tabs to edges of sheets which comprises, in combination: conveyor means for advancing a sheet in a first direction across a table; tab attaching means reciprocable toward and away from said table at a predetermined position measured in said first direction along said table; first sensor means operable to sense an indicium carried on said sheet to provide a braking signal, said braking signal being connected to control said conveyor means, whereby successive sheets having their respective indicia located at different respective positions are stopped at different positions along said table measured in said first direction.

21. Apparatus according to claim 20 wherein said tab attaching means comprises turret means rotatably indexable about an axis substantially perpendicular to the surface of said table, said turret means carrying a plurality of clamp means each operable to carry and to fold a tab.

22. Apparatus according to claim 20 wherein said conveyor means comprises a pair of endless belts adapted to engage each of said sheets on opposite sides of the sheet, and motive means for advancing said endless belts in synchronism with each other.

23. Apparatus according to claim 20 having second sensor means operable after further translation of said sheet in said first direction for sensing said indicium and the presence or absence of a tab to control stopping of said conveyor means.

24. Apparatus according to claim 20 having second and third sensor means spaced apart in said first direction so that a sheet stopped at a particular one of said different positions will occlude the passage of light to said second sensor means and permit the passage of light to said third sensor means.

25. Apparatus according to claim 21 wherein each of said clamp means comprises a vacuum gripping means operable to temporarily grip a tab, and a pair of pivotable jaws operable to clamp a portion of said first edge of said sheet between a pair of adhesive-carrying leaves of said tab.

26. Apparatus for affixing tabs to edges of pages at different locations along said edges, comprising, in combination: first means for transporting individual tabs in a predetermined sequence to a predetermined tab application location; second means for transporting a succession of pages to and beyond said tab application location; means for sensing marks along an edge of various of said pages and for stopping each page from which a mark is sensed so that said mark is located at said tab application location; and means for applying the tab which has been transported to said tab application location to an edge of the page stopped with its mark located at said tab application location.

27. Apparatus according to claim 26 wherein said first means includes knife means; means for advancing a continuous strip past said knife means, and means for operating said knife means to cut said individual tabs from the end of said continuous strip.

28. Apparatus according to claim 26 wherein said first means includes clamp means having a source of vacuum and adapted to hold an individual tab against said calmp means while said tab is transported to said tab application location.

29. Apparatus according to claim 26 wherein said first means includes tab holding and tab folding means; and knife means for cutting said individual tabs from a continuous strip and for transporting said individual tabs to said tab holding and tab folding means.

30. Apparatus according to claim 26 wherein said first means includes a rotatable turret means having a plurality of tab holding and tab folding means; and means for transporting individual ones of said tabs to successive ones of said tab holding and tab folding means.

31. Apparatus according to claim 26 having adhesive activating means for activating adhesive on said tabs as they are transported by said first means to said tab application location.

32. Apparatus according to claim 26 wherein said second means comprises means for feeding sheets from a stack; means for receiving sheets fed from said stack, aligning an edge of said sheets and transporting aligned sheets; means for receiving said aligned sheets and transporting said sheets to and past said tab application location; means for inverting sheets transported past said tab application location, and means for stacking the inverted sheets.

33. Apparatus according to claim 27 wherein said means for advancing said strip comprises stepping motor means; and photosensor means operative to sense holes in said strip to control the operation of said stepping motor means.

34. Apparatus according to claim 27 wherein said knife means comprises a stationary first member having a slot through which said continuous strip is advanced; and a knife block reciprocable against said first member to cut individual tabs from the end of said strip.

35. Apparatus according to claim 28 wherein said clamp means comprises first and second jaw members each having a surface provided with a plurality of holes connected to said source of vacuum; and means for pivoting said jaw members about respective axes which are mutually parallel and spaced apart from each other.

36. Apparatus according to claim 28 having means for moving said clamp means toward and away from an edge of a page momentarily stopped at said tab application location.

* * * * *